United States Patent [19]

Urabe

[11] Patent Number: 4,792,863

[45] Date of Patent: Dec. 20, 1988

[54] APPARATUS FOR RECORDING STILL IMAGE WITH RANDOM NOISE MINIMIZED

[75] Inventor: Hitoshi Urabe, Kaisei, Japan

[73] Assignee: Fuji Photo Film Co. Ltd., Kanagawa, Japan

[21] Appl. No.: 943,935

[22] Filed: Dec. 19, 1986

[30] Foreign Application Priority Data

Dec. 21, 1985 [JP] Japan ................................. 60-286910

[51] Int. Cl.⁴ ............................................... H04N 5/76
[52] U.S. Cl. ..................................... 358/335; 358/909
[58] Field of Search ................................ 358/335, 909

[56] References Cited

U.S. PATENT DOCUMENTS

| | | | |
|---|---|---|---|
| 4,074,324 | 2/1978 | Barrett | 358/909 |
| 4,161,749 | 7/1979 | Erlichman | 358/909 |
| 4,262,301 | 4/1981 | Erlichman | 358/909 |
| 4,287,529 | 9/1981 | Tatami . | |
| 4,346,401 | 8/1982 | Ohara | 358/909 |
| 4,438,453 | 3/1984 | Alston . | |
| 4,541,010 | 9/1985 | Alston | 358/909 |
| 4,553,175 | 11/1985 | Baumeister | 358/909 |

FOREIGN PATENT DOCUMENTS 0070677 7/1982 European Pat. Off. .

OTHER PUBLICATIONS

F. H. Weinel—"A Major Step Forward in Video Printing", The BKSTS Journal, vol. 62 (1980).

*Primary Examiner*—Russell E. Adams
*Attorney, Agent, or Firm*—Birch, Stewart, Kolasch & Birch

[57] ABSTRACT

Apparatus for recording a still image includes an input unit for repeatedly receiving video signals representative of a still image, a memory capable of storing video signal data of at least one picture frame of the received video signals, a control unit for controlling the writing into and reading out of the memory, and a recorder for recording the video signal data read out of the memory on a picture recording medium in the form of a visual image. The control unit performs a plural number of cyclic operations of storing the video signals received by the input unit in the memory timed with the operation of the input unit, and reading out the stored video signal data timed with the operation of the recorder, such that the same still image is superimposed on the picture recording medium by the operation of the recorder.

5 Claims, 3 Drawing Sheets

APPARATUS FOR RECORDING STILL IMAGE WITH RANDOM NOISE MINIMIZED

BACKGROUND OF THE INVENTION

1. Field of the Invention

The present invention relates to apparatus for recording a still image, and more particularly to such apparatus for recording a visible image on an image recording medium from video signals representative of the still image.

2. Description of the Prior Art

In general, when reproducing video signals recorded on a video signal recording medium, such as a video floppy disk or video tape, random noise may be generated due mainly to instabilities in the reproducing system. Random noises are generated for example from the playback head or magnetic transducer portion of the reproducing system, in such a manner that they are distinct from the stationary noise contained inherently in the video signals recorded on the video signal recording medium, and therefore they are transient in generation.

It is well-known that a higher quality of the reproduced image is more strongly desired in a cases of a still image and a soft copy than in the cases of a moving image and a hard copy. Hence, in a still image recording device, it is desirable to have those random noises removed sufficiently from the video signal to be recorded while recording a high quality picture.

SUMMARY OF THE INVENTION

It is therefore an object of the present invention to provide apparatus for recording a still image with random noise minimized.

According to the present invention, there is provided apparatus for recording a still image comprising input means for repeatedly receiving video signals representative of a still image, memory means for storing video signal data of at least one picture frame of the input video signals, control means for controlling said memory means in writing and reading operations, and recording means for recording the video signal data read out from said memory means on a picture recording medium in the form of a visible image, said control means performing the cylic operations of storing in said memory means the video signals received by said input means in synchronism with said input means and reading the stored video signal data in synchronism with said recording means to cause said recording means to record the still image repetitively on the picure recording medium.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENTS

Reference is now made to the accompanying drawings illustrating specific preferred embodiments of the present invention.

Figure 1:
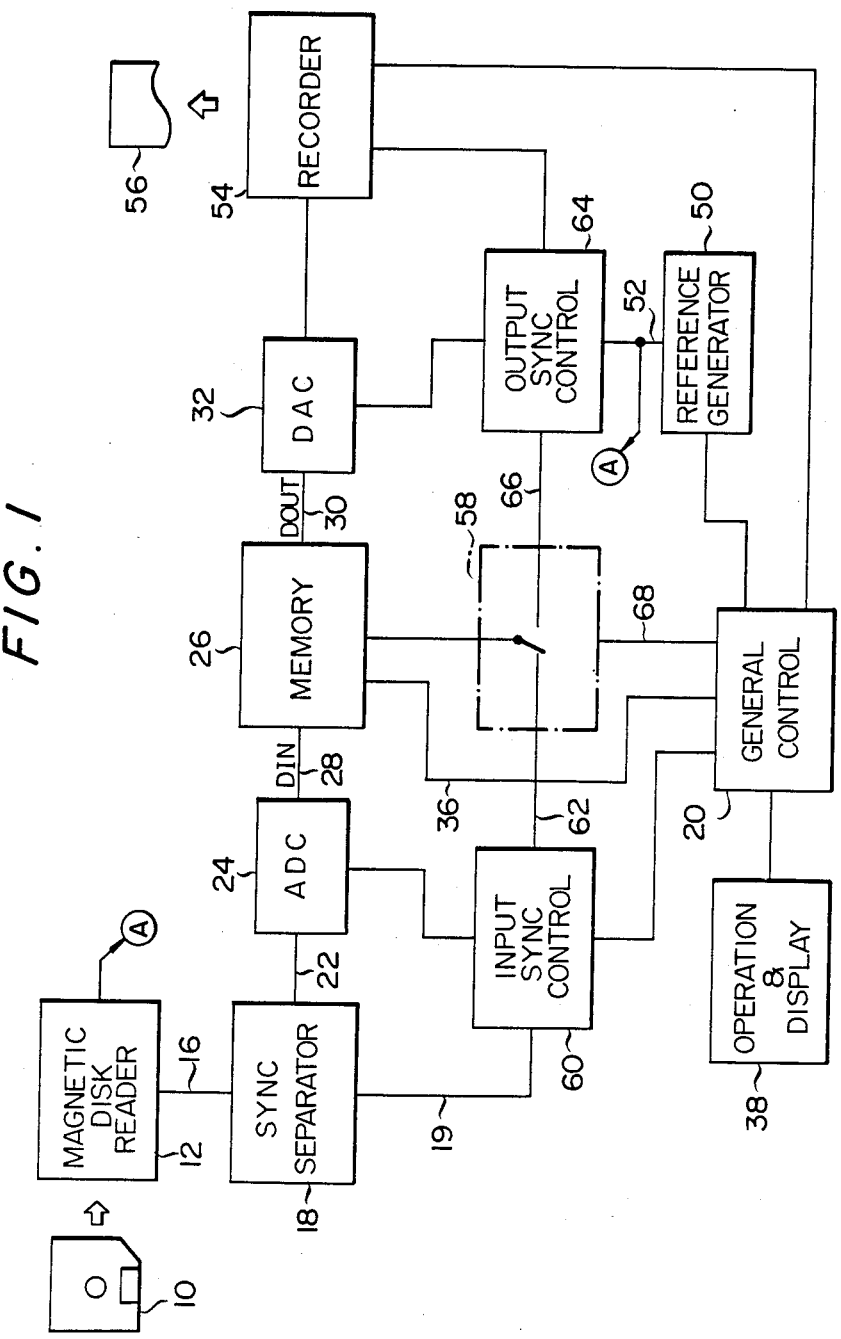
FIG. 1 is a schematic block diagram showing an embodiment of a still image recording apparatus according to the present invention.

Referring first to FIG. 1, there is shown an embodiment wherein the present invention is applied to a still image recording device adapted for reproducing picture signals from a video floppy disk. In the present embodiment, there is provided a magnetic disk reader 12 for reading video signals recorded on a magnetic disk or a video floppy disk 10 as a picture signal recording medium.

According to the present embodiment, a type of disk 10 may advantageously be used in which recording can be made on fifty tracks and in which one frame of picture is recorded on a pair of tracks in the form of two component fields so that the picture recording capacity of the disk 10 is 25 frames at the maximum.

A magnetic disk reader 12 in the present embodiment has a servo system adapted for receiving an output 52 of a reference generator 50 as indicated with connection mark A, which generates clocks of a stable frequency, so as to generally synchronize the magnetic disk 10 in rotation with these clocks. By virtue of this servo system, the reader 12 is able to read video signals from the tracks of the magnetic disk 10 for producing the signals at port 16. In place of the reader 12, any other input devices such as a video tape playback unit or a receiver for receiving video signals from broadcast waves or communication channels, may be used advantageously within the scope of the present invention.

The input video signals will ultimately be output in the form of visible image from a recorder 54 on a picture recording medium 56 such as photographic paper. The recorder 54 according to the present embodiment may advantageously be of the type in which a picture displayed on a CRT is focused on photographic paper through an optical system.

The video signals at the output port 16 are supplied to a sync separator 18, which in turn separates therefrom sync signals including vertical sync signals contained in the sensed video signals to be produced at output port 19. The sync signals thus separated will ultimately be supplied to a general control 20. Sync separator 18 also produces the sensed video signals at another output port 22 in the form of analog signals that are then converted into video signal data in digital form by an analog-to-digital converter (ADC) 24. In the present embodiment, these video signal data are supplied to an input 28 of a memory 26 for performing the function of time base correction.

The memory 26 is comprised of a RAM capable of temporarily storing video signals for one frame. The operation of writing to and reading out of the RAM is controlled by the general control 20. The control 20 is capable of not only generating control signals such as read or write commands for the memory 26 at a control output 36 but also controlling the general operations of the instant recording apparatus. A variety of control signals for the memory 26, such as addresses, clocks and read/write timing signals, are supplied through a switching part 58 from an output 62 of an input sync control 60 or an output 66 of an output sync control 64. The switching part 58 is a selecting circuit which is operative in response to switching signals received from the control 20 on a control line 68 and accordingly selects alternatively the controls signals from the sync control 60 and 64.

The video signals developed at port 16 from th reader 12 may contain jitter on account of mechanical driving of the recording medium 10. Thus, each time the memory 26 stores the video signal data DIN on line 28 in synchronism with pixel clocks timed to horizontal sync signals separated at the sync separator circuit 18 it produces those video signal data during the effective horizontal scanning period at an output 30 at the pixel clock rate timed to stable reference clocks 52, accomplishing thereby time axis correction to stabilize the output rate of the video signal data DOUT at the output 30.

The time axis corrective function is accomplished as follows. The control 20 sets the switching part 58 to a position shown for reading video signals from the magnetic disk 10 to the memory 26. As a result, the writing operation at the memory 26 is placed under the control of the input sync control 60. More specifically, the sync signals contained in the video signals read from the magnetic disk 10 are separated by the sync separator 18 and applied to control 60. In response thereto, the input sync control 60 produces control signals such as addresses, clocks and write timing signals at the output 62 to control the writing operation of the memory 26.

When reading out the video signal data from the memory 26 for reproducing images on the recording medium 56, the control 20 sets the switching part 58 to the position opposite to that shown in the figure, such that the reading operation from the memory 26 is controlled from the output sync control 64. Thus, in synchronism with the clocks of the stabilized frequency supplied from a reference generator 50, the output sync control 64 produces control signals such as addresses, clocks and read timing signals on lead 66 to control the reading operation of the memory 26.

The disk reader 12 reads video signals from the tracks of the magnetic disk 10 with a magnetic playback head. Because of instabilities in contact of the head with a track, random noises are likely to be generated in the reproduced video signals. According to the present embodiment, those random noises are removed from an image, which is ultimately to be recorded on a recording medium 56, by making use of a memory 26 as the time axis corrector.

The output video signal data DOUT are fed to a digital-to-analog converter (DAC) 32 where they are converted into corresponding analog signals that are then supplied to a recorder 54 in the form of TV rate video signals, for example.

The operation of the various parts of the present recording device are controlled by the control 20. An operation and display unit 38 is connected to control 20, which is adapted to input necessary commands such as commands for the recording of images represented by the video signals sensed from the magnetic disk 10 on the recording medium 56, and also to display the system statuses, for example.

Figure 3:
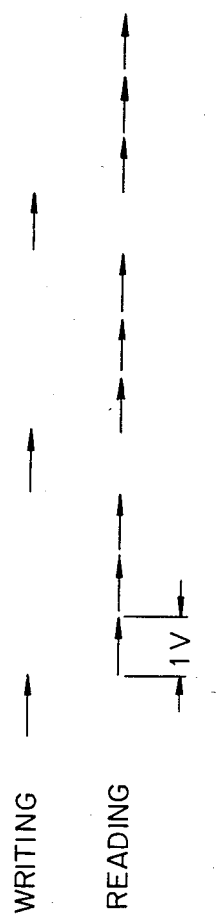
FIGS. 3 and 4 are explanatory charts useful for understanding the operations of the embodiments shown in FIGS. 1 and 2, respectively.

The operation of the above described recording device is explained by referring also to FIG. 3. When recording a picture on the recording medium 56 by the recorder 54, video signals of the same frame are repeatedly read from the magnetic disk 10 by the reader 12, and repeatedly written in addition over the same frame of the recording medium 56 by the recorder 54.

More specifically, the reading operation of the reader 12 is generally synchronized with the sync signals generated by the reference generator 50. In synchronism with the vertical sync signals from the input sync control 60, the control 20 connects the switch 58 to the position shown in the vertical blanking period, so that writing to the memory 26 becomes controlled from the input sync control 60.

In synchronism with the sync signals separated by the sync separator 18 from the video signals read from the magnetic disk 10, the input sync control 60 produces control signals such as addresses, clocks and write timing signals at the output 62 to the memory 26 through the switch 58. The video signals supplied from the output 22 of the sync separator 18 are converted by converter 24 into digital signals, which are in turn sequentially written into the memory 26. In this manner, the video signal data for one frame (1V) are written into the memory 26. In FIG. 3, this is indicated by the length of arrow. During this writing period, the output sync control 64 controls the recorder 54 for blanking its output on the CRT screen.

In the next vertical blanking period, the control 20 controls the switch 58 to revert to the state opposite to that shown in FIG. 1. This causes the reading from the memory 26 to be controlled by the output sync control 64. In timing with the clocks of a stabilized frequency generated by the reference generator 50, the output sync control 64 develops control signals including addresses, clocks and read timing signals at its output to the memory 26 through the switch 58.

From the memory 26, the video signal data are read out in a raster scanning fashion and then converted by converter 32 into analog signals, which are in turn supplied to the recorder 54. Those are displayed on the CRT screen of the recorder 54, of which an exposure is then made on the recording medium 56 through an optical system, not shown. In this manner, the video signal data for one frame are sequentially read from the memory 26 over one frame period from the time of the vertical blanking signal so as to ultimately cause the frame to be exposed on the recording medium. During this reading period, the input sync control 60 controls the memory 26 to inhibit video signal data from being written thereinto.

This reading operation is repeated for three frame periods, for example, for exposing the same picture of three frames on the same portion of the recording medium.

The control 20 then resets the switch 58 to the position shown during the next vertical blanking period in order to cause video signals of the same frame to be written from the magnetic disk 10 to the memory 26. After termination of the reading, the control circuit 20 resets the switch 58 to the position opposite to that shown during the next vertical blanking period for reading the video signal data from the memory 26 to record the read data on the recording medium 56 in the form of a visual image. The control 20 repeatedly performs this recording for three consecutive frame periods in the illustrative embodiment.

The control 20 executes a plurality of cyclic operations each consisting of reading from the magnetic disk 10 and recording on the recording medium 56 for a time period of one second, for example, so as to perform a plurality of exposures of the same frame on the same portion of the recording medium 56. In this manner, the scanning lines constituting an image are repeatedly recorded on the recording medium 56 over and over by use of the video signals obtained from successive reading operations of the same frame. This follows that the random noise produced by one reading from the disk 10 is written over by the signals obtained from another reading such that a picture with reduced random noise is ultimately formed on the recording medium 56. For example, when reproducing a color picture, such overwriting or superimposed writing is made for each of the three fundamental colors on the medium 56, which is then developed to reproduce ultimately a color picture with random noise minimized.

The noise reducing system for still images according to the present embodiment may be classified under what is called a non-recursive scheme wherein the random noises are averaged by integrating the image over time to be exposed on the photosensitive material of the recording medium 56.

Figure 2:
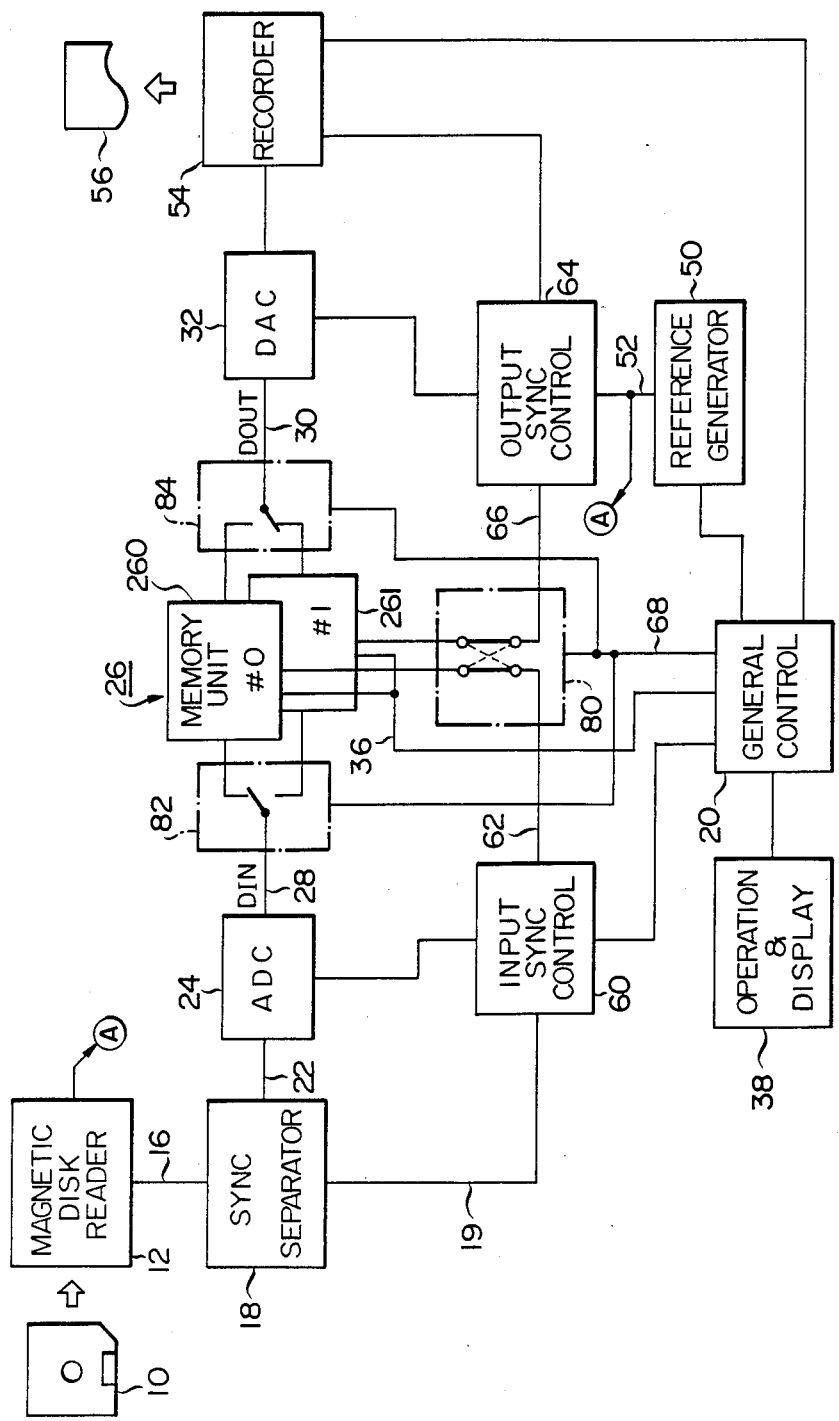
FIG. 2 is a schematic block diagram, similar to FIG. 1, showing an alternative embodiment of the present invention.

An alternative embodiment of the present invention is shown in FIG. 2, wherein like parts or portions shown in FIG. 1 are inclined with the same reference numerals. In the present embodiment, the memory 26 is duplicated and comprised of a memory unit #0, 260, and another memory unit #1, 261, each having the storage capacity of one frame of video signal data. A data input 28 is connected to the memory units #0 and #1 through a switch 82, while a data output 30 is connected to the memory units #0 and #1 through another switch 84. The switches 82 and 84 are selecting circuits controlled by the control 20 in such that the switches may selectively and alternately assume either the positions shown or positions opposite to those shown with one of the memory units is in its write state while the other unit in its read state and vice versa.

A control output 62 of an input sync control 60 and a control output 66 of an output sync control 64 are connected to the memory 26 through a switch 80. The switch 80 is a selecting circuit similarly controlled by the control 20 for selectively assuming a connection indicated with the solid lines and a connection depicted with the dotted lines for supplying control signals from the input sync control 60 to the memory unit #0 or #1 in the write state, or from the output sync control 64 to the memory unit #1 or #0 in the read state.

Figure 4:
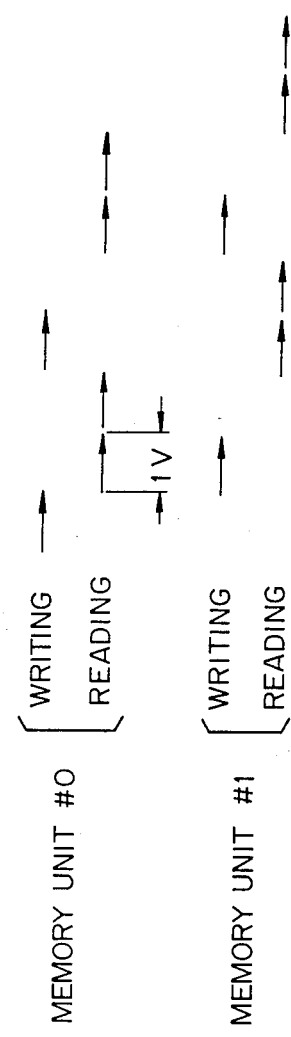

In the alternative embodiment, during the time that the one-frame video signal data are consecutively read twice from the memory unit #0, as shown in FIG. 4 for example, so as to be recorded on the recording memory 56, the video signals for the same frame are newly written from the magnetic disk 10 into the other memory unit #1. By repeating the above operations for the alternate memory units, video signals of the same frame can be read out and overwritten into the alternate units a number of times.

It should be noted that the number of times of recording, m, on the recording medium 56 for the number of times of reading, n, from the magnetic disk 10 and the number of times overwriting, N, by the repetition of the reading and recording operations, are not limited to those used in the above illustrative, preferred embodiments. The number of times, m, of recording depends on the sensitivity of the photosensitive material used on the recording medium 56 and the output brightness of the CRT involved in the recorder 54, and may typically be unity (m=1). The number of times of overwriting N ($\neq$1) is so set that sufficient noise reduction will be achieved. The number of times n of reading need not be equal to unity.

Although the foregoing description has been made on the case of handing of frame signals, it is to be noted that the present invention can also be applied to a reproducing system handling field signals. It should also be noted that the present invention is applied not only to video signals supplied from a video signal recording medium, but also to video signals received from broadcasting or communication networks, for example.

From the foregoing, it is seen that the present invention provides an arrangement in which one frame of video signals obtained from the reading of the same portion of a video signal recording medium frame are written a number of times over the same rectangular frame portion of a picture recording medium so that random noises contained in one reading of the video signals are overwritten with another reading of the same signals, with the result that a still image with random noises reduced may ultimately be formed on the picture recording medium.

What is claimed is:

1. Apparatus for recording a still image on an image recording medium, comprising:
   input means for repeatedly receiving video signals representing one particular still image;
   memory means for storing data representative of said received video signals and having a storage capacity of at least one frame of video data;
   recording means responsive to data read out from said memory means for recording a still image represented by said data on an image recording medium;
   control means for controlling said memory means and said recording means, including,
      means for repeatedly writing data representative of said repeatedly received video signals into said memory means to be stored therein, and
      means for repeatedly reading data stored in said memory means out to said recording means for recording on said image recording medium;
   said recording means thereby repeatedly superimposing said still image on said image recording medium in response to said repeated writing and reading of said data into and out of said memory means.

2. The apparatus set forth in claim 1, wherein said means for repeatedly writing comprises write control means for causing said data to be stored in said memory means in synchronism with a receiving rate of said input means;
   said means for repeatedly reading comprises read control means for causing the data stored in said memory means to be read out at a predetermined rate;
   said control means further including selector means for selectively connecting either said write control means or said read control means to said memory means for alternately writing and reading data into and out of said memory means.

3. The apparatus set forth in claim 1, wherein said memory means comprises two memories;
   said means for repeatedly writing comprises write control means for causing said data to be stored either of said memories in synchronism with a receiving rate of said input means;
   said means for repeatedly reading comprises read control means for causing the data stored in either of said memories to be read out at a predetermined rate;
   said control means further including selector means for selectively connecting said write control means and said read control means to alternate ones of said two memories such that data is alternately written into one memory while being read out from the other memory.

4. The apparatus set forth in claim 1, wherein said input means comprises magnetic disk reader means for repeatedly reading video signals representing one particular still image from a magnetic disk.

5. The apparatus set forth in claim 1, wherein said image recording medium comprises photosensitive paper;

said recording means repeatedly exposing said photosensitive paper with said still image represented by said data.

* * * * *